Jan. 6, 1948.
W. J. MILLER
2,433,956
LIGATION INSTRUMENT
Filed Nov. 15, 1946
2 Sheets-Sheet 1
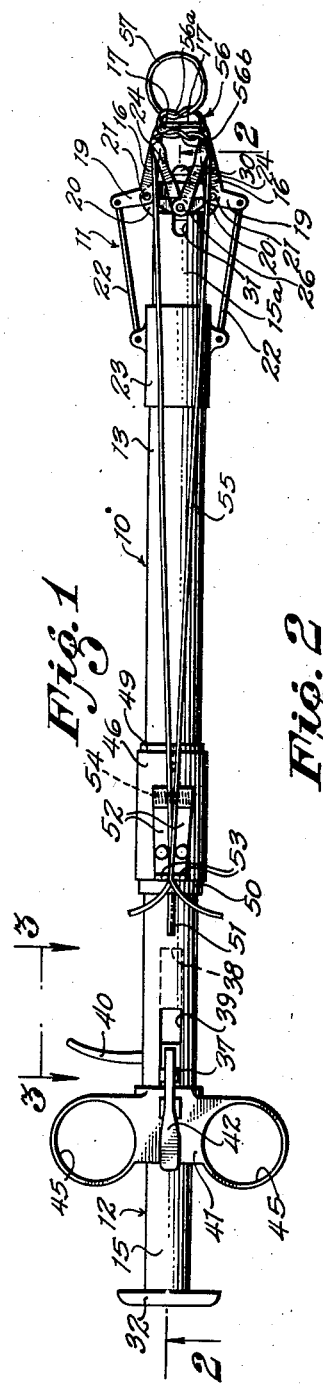
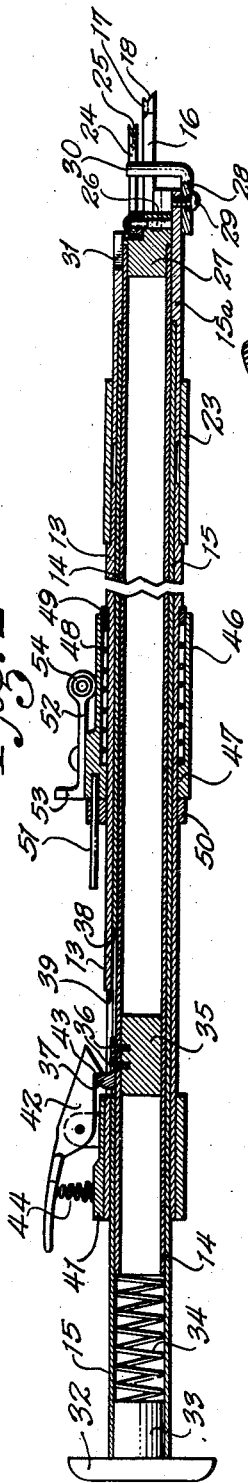
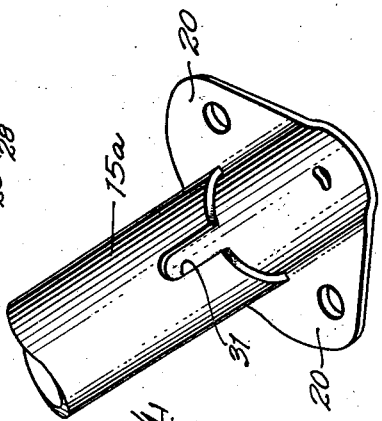
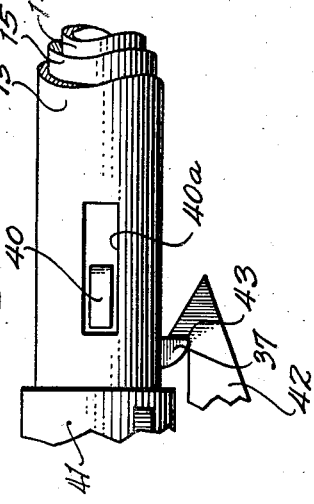
INVENTOR,
WILLIAM J. MILLER
BY
ATTORNEYS.

Jan. 6, 1948.   W. J. MILLER   2,433,956
LIGATION INSTRUMENT
Filed Nov. 15, 1946   2 Sheets-Sheet 2
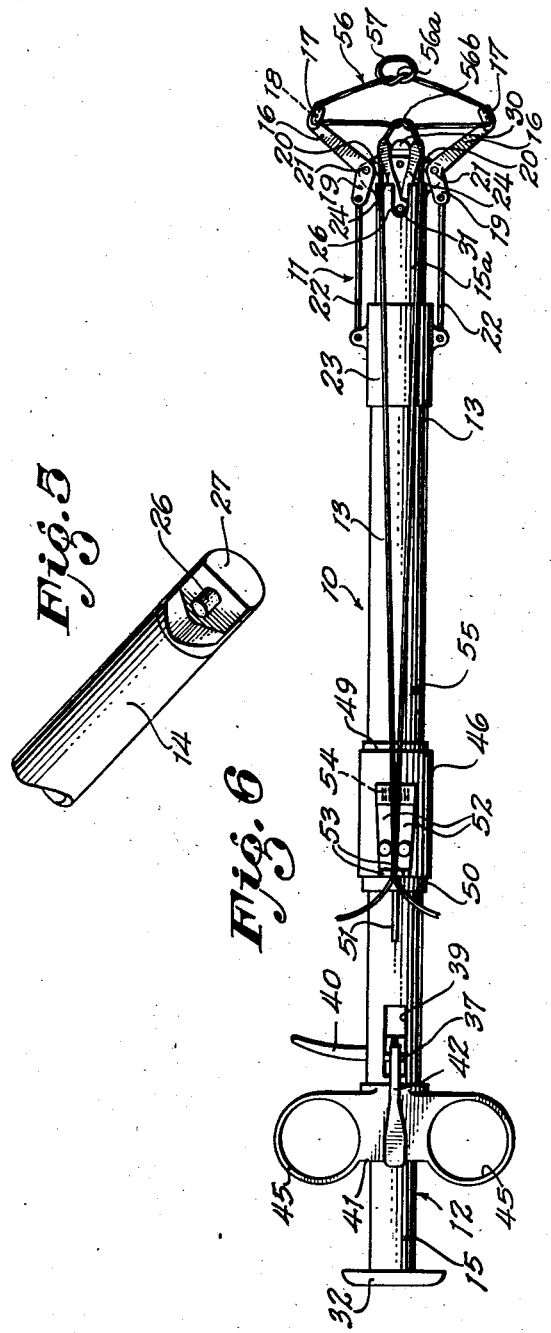
INVENTOR,
WILLIAM J. MILLER
BY
ATTORNEY.

Patented Jan. 6, 1948

2,433,956

UNITED STATES PATENT OFFICE 2,433,956

LIGATION INSTRUMENT

William J. Miller, Glendale, Calif., assignor to The Deutsch Company, Los Angeles, Calif., a partnership Application November 15, 1946, Serial No. 710,161

3 Claims. (Cl. 128—326)

The present invention relates generally to a device for tightening knots and is more particularly concerned with an instrument of such character, which may be utilized during surgical operations for placing and tightening a ligature about a severed blood vessel or the like.

During surgical operations, it very often becomes necessary to tie off a severed blood vessel which is so positioned that a very small space is available in which to tie a firm knot by hand. Moreover, under such conditions, the ligation is rendered more difficult because of the rubber gloves which are worn by the surgeon.

The present invention therefore proposes to provide a ligating instrument which may be previously prepared or loaded with a pre-tied ligature, wherein a loop is firmly supported in projecting position so as to permit its being easily slipped over the severed vessel within the cavity and secured about the severed vessel by a simple manual manipulation of the instrument. The instrument will permit ligation with a minimum of risk under emergency conditions, within a minimum period of time and without the necessity of having to increase the size of the incision to perform the ligation. In practice, the use of the instrument described herein has been found to add materially to the safety and well being of the subject of the operation, and may very well be the determining factor in a difficult operation.

Having the foregoing in mind, it is a primary object of my herein described invention to provide an instrument for supporting a pre-tied ligature with an open loop which may be slipped over an object around which it is desired to tie the ligature, and by means of a simple digitally operable mechanism, may be actuated to tighten the loop and tightly draw up the knot to hold the loop against loosening.

A further object of the invention is to provide an instrument of the herein described character, which may be previously prepared or loaded with a pre-tied looped ligature so as to be available at a moment's notice for use.

A still further object of the invention is to provide an improved instrument of the herein described type which is of simple construction, efficient and dependable in operation, and is sufficiently small to insert through a relatively small incision into the operative cavity during an operation, without the necessity of having to make an enlarged incision, and is so constructed that a supported ligature may be applied and tightened from a point removed from the point of application.

Further objects of the invention will be brought out in the following part of the specification, wherein detailed description is for the purpose of fully disclosing preferred embodiments of the invention without placing limitations on the scope of the invention defined in the appended claims.

Referring to the drawings which are for illustrative purposes only:

Fig. 1 is a plan view of an instrument embodying the features of the present invention, and showing it loaded with a pre-tied and looped ligature;

Fig. 2 is a longitudinal sectional view with certain parts shown in full lines, taken substantially on line 2—2 of Fig. 1;

Fig. 3 is a detailed fragmentary view in elevation of the latching mechanism, as viewed from line 3—3 of Fig. 1;

Fig. 4 is a detailed isometric view showing the structure at one end of the intermediate tubular member;

Fig. 5 is a similar detailed view showing the construction at one end of the inner tubular member;

Fig. 6 is a plan view of the device illustrating the position of its parts upon being operated to perform the first step in the application of the ligature loop to a severed vessel; and Fig. 7 is a similar view illustrating the position of the parts during the second step in the application of the ligature to the severed vessel.

As shown on the drawings, the ligating instrument of my invention comprises generally a shank structure 10 which is provided with the ligature supporting mechanism 11 at one end and manually operable means, as generally indicated at 12, at the other end of the shank structure for actuating the ligature supporting mechanism to apply the loop of the ligature to a vessel and tighten it in applied position.

The shank structure, as shown in Fig. 2, consists of an outer tubular member 13, an inner tubular member 14, and an intermediate tubular member 15, these tubular members being concentrically arranged and so supported that they may be relatively moved in longitudinal direction. The tubular members are interconnected with the ligature supporting mechanism at one set of their ends, and at their other set of ends with the manually operable means to enable the ligature to be applied at a point remote from the manually operable means.

The ligature supporting and applying mechanism 11 includes a first set of fingers 16—16, each of which is provided with an angularly disposed spur 17 having an end V-shaped groove 18 therein. At its other end, each finger 16 has an angularly disposed portion or leg 19 forming a crank for pivotally actuating the arm about a pivot which will subsequently be explained.

As shown in Fig. 4, it will be noted that the intermediate tubular member 15 carries an end nose piece 15a which is deformed to provide integral oppositely projecting wings 20—20 which serve as supports for the fingers 16—16, the fingers being respectively pivoted on pintles 21 for swinging movement. As will be seen, the fingers 16—16 are mounted with their spurs 17 in confronting relation so that the grooves 18 therein are in alignment when the spurs are in close or abutting relation. The legs 19 of the fingers project in opposite direction from the intermediate tubular member and are respectively connected through links 22 with a tubular yoke 23. This yoke is positioned at one end of the outer tubular member 13 and secured thereto by suitable means, such as soldering, brazing or the like. With the foregoing construction, it will be seen that relative longitudinal movement of the outer tubular member 13 and the intermediate tubular member 15 will result in actuation of the fingers 16—16 to cause their relative movement between closed position as shown in Fig. 1 to an extended or spread apart position as shown in Fig. 6.

A second set of fingers 24—24 is provided, each of these fingers having an end groove 25 of V-shape. The fingers 24—24 are pivoted at one set of their ends on a common pintle 26, as shown in Fig. 5, carried by a plug member 27 supported in an end of the innermost tubular member 14. The nose piece 15a carries an angular end bracket 28 which is secured thereto, as by a screw 29, as shown in Fig. 2, this bracket having a leg 30 lying between the fingers 24—24 and serving to limit their inward swinging movement to close position, as shown in Fig. 1. With this construction, it will be apparent that relative movement of the inner tubular member and intermediate tubular member in a direction to move the pintle 26 toward the leg 30 will act to spread the fingers 24—24 into a spread apart or extended position as shown in Fig. 7. The nose piece 15a is provided with an open ended slot 31 for receiving the head of the pintle 26 when the position of the inner tubular member is such as to permit movement of the fingers 24—24 into close position.

It should be pointed out here that the two sets of fingers previously described above are so mounted that they have pivotal movement in planes which are spaced apart, so that each set of fingers may be spread apart or moved to close position without interfering with the other set.

As shown in Fig. 2, the manually operable means includes a button member 32 supported in the end of the intermediate tubular member 15, this button member having a shank portion 33 which extends into the tubular member and forms an abutment for one end of a compression coiled spring 34 having its other end in engagement with an end of the inner tubular member 14 which terminates short of the end of the intermediate tubular member 15. The action of this spring is to relatively move the inner tubular member to the right and the intermediate tubular member to the left as viewed in Fig. 2.

Inwardly disposed from this end of the inner tubular member 14 is a filler block 35 for receiving the securing screws 36 for a lug member 37 carried by the inner tubular member and projecting outwardly through overlying slots 38 and 39 in the intermediate tubular member and outer tubular member respectively. The lug member 37 also acts as a stop to limit movement of the inner tubular member toward the right, as shown in Fig. 2, under the influence of the spring 34.

Provision is made for moving the inner tubular member in the opposite direction in order to bring the lug 37 to a cocked position against the force of the spring 34. This is readily accomplished by means of a finger grip 40 positioned 90° from the lug 37 and projecting outwardly through a suitable slot 40a in the outer tubular member 13, as shown in Fig. 3.

At this end of the outer tubular member, there is also provided a bracket 41, upon which there is pivotally mounted a latch member or detent 42 having a notched end 43 for engaging over the lug 37 to retain the lug in cocked position. A suitable spring 44 releasably retains the latch member in latching position in engagement with the lug 37. The bracket 41 also is laterally extended and formed to provide finger engageable loops 45 respectively disposed on the opposite sides of the outer tubular member 13.

The outer tubular member 13 carries a mechanism for imparting tension to the ligature which is previously prepared and loaded in the instrument. For this purpose, a tubular sleeve 46 is slidably mounted on the outer tubular member, this sleeve having an internal end flange 47 at one end which forms an abutment for a compression coiled spring 48 which is arranged to abut at its other end a collar 49 which is secured to the outer tubular member and also acts as a spacer or bearing ring for the sleeve 46. The sleeve 46 is retained in position by a ring 50 attached to the outer tubular member. The sleeve 46 is further retained against movement circumferentially of the outer tubular member and confined to longitudinal movement thereof by means of a guiding pin 51 carried by the sleeve and extending through a suitable opening in the ring 50.

On one side of the sleeve 46, there is mounted a pair of clamping members 52—52 for relative pivotal movement, these members being provided with deflected end portions 53 adapted to grippingly engage a ligature therebetween. A coiled spring 54 acts to move the end portions 53—53 toward each other into gripping relation. With the arrangement just described, if the sleeve 46 is moved to the right as viewed in Fig. 2, against the pressure of the spring 48, and a ligature is then clamped between the ends of the clamping members, the action of the spring 48 will act to put the ligature under tension for a purpose which will be hereinafter described.

The loading and manner of operating the instrument of my invention will now be described. As shown in Fig. 1, a ligature, generally indicated by the numeral 55, is tied with a square knot 56 therein to form a loop portion as shown at 57, the knot having a first portion 56a and a second portion 56b. The ligature as thus tied is placed in the instrument by inserting the spurs 17—17 of the fingers 16 into the opposed loop portions of the knot so that the first knot portion will lie within and be gripped by the walls of the V-shaped groove 18 therein. With the lug 37 in cocked position and latched by the latch member or detent 42, so as to permit the second set of fingers 24—24 to move into close position, the running ends of the ligature are trained over the ends of the fingers 24—24 so as to lie in the end grooves 25 thereof and carried along the shank of the instrument whence they are grippingly engaged by the end portions 53—53, the sleeve 46 having first been moved against the pressure of the spring 48 before clampingly engaging the ligature. It will be noted that with the instrument loaded as just described, the loop 57 projects therefrom and may be easily inserted over an object or severed vessel about which the loop is to be tied.

It is contemplated that a number of these instruments would be pre-loaded and maintained in a sterilized condition for use when called for during an operation. Thus, when it is desired to tie off a severed vessel, the surgeon need only call for a loaded instrument. By placing the button 32 in the palm of the hand and inserting fingers through the finger engageable loops 45—45, the instrument may be moved into any desired position to facilitate placing the loop 57 over the severed vessel. With the loop 57 properly located, the hand is merely gripped to move the button 32 and loops 45 toward each other, this action operating to cause relative movement between the outer and intermediate tubular members in such a direction as to cause the first set of fingers 16—16 to move to spread apart position as shown in Fig. 6. As a result of the tension applied to the ligature, the spreading of the fingers 16 acts to tighten the first knot portion 56a and pull the loop 57 tightly around the vessel.

To complete the operation and tighten the knot so as to securely hold the loop and prevent its becoming loose, it is only necessary to release the latch member 42. The lug 37 now being released, the spring 34 acts to move the inner and intermediate tubular members in such direction that the pintle 26 moves toward the leg 30 to cause the fingers 24—24 to quickly spread apart to the position shown in Fig. 7. This action tightens the second knot portion 56b, and in so doing draws in on the loop portions of the knot which are over the spurs on the fingers 16—16. This pulls the fingers 16—16 to close engagement and in so doing, disengages the associated portions of the ligature therefrom, so that the second portion of the knot may move into tight engagement with the first portion of the knot and securely retain the loop 57 against loosening. It is then an easy operation to release the ends of the ligature from the clamp members 52, simply by pressing the sprung ends thereof together.

I claim as my invention:

1. A ligating device comprising an inner tubular member, an outer tubular member, an intermediate tubular member, said members being disposed in concentric relation and forming a shank structure, a first pair of pivotally mounted fingers at one end of the intermediate tubular member, a second pair of pivotally mounted fingers at one end of the inner tubular member, said fingers having their free ends arranged for engaging and supporting a ligature, a connection between the outer tubular member and said first pair of fingers operative to open and close them upon relative movements of the outer and intermediate tubular members, means operable to open and close said second pair of fingers in response to relative movements of the inner and intermediate tubular members, and means at the other ends of said tubular members for effecting relative movements therebetween to actuate said fingers.

2. A ligating device comprising a shank structure consisting of a plurality of concentrically disposed tubular members, a plurality of movably mounted fingers at one end of said shank structure arranged to support the loop of a ligature formed by a pre-tied knot therein and upon actuation to tighten the loop and knot, manually actuatable means at the opposite end of the shank structure, and connections between said means and fingers respectively and said tubular members, whereby the actuation of the fingers and the application of the ligature may be accomplished from a point removed from the ligature knot.

3. A ligating device comprising a shank structure consisting of a plurality of concentrically disposed tubular members, a plurality of movably mounted fingers at one end of said shank structure arranged to support the loop of a ligature formed by a pre-tied knot therein and upon actuation to tighten the loop and knot, manually actuatable means at the opposite end of the shank structure, connections between said means and fingers respectively and said tubular members whereby the actuation of the fingers and the application of the ligature may be accomplished from a point removed from the ligature knot, and means carried by the shank structure for gripping the ends of said ligature and applying a tension thereto.

WILLIAM J. MILLER.

REFERENCES CITED

The following references are of record in the file of this patent:

UNITED STATES PATENTS

| Number | Name | Date |
|---|---|---|
| 1,625,602 | Gould et al. | Apr. 19, 1927 |
| 1,691,386 | Fisher | Nov. 13, 1928 |